United States Patent [19]

Masco et al.

[11] 3,959,599

[45] May 25, 1976

[54] CALL INITIATION DELAY ARRANGEMENT FOR DIGITAL DATA SWITCHING SYSTEM

[75] Inventors: Donald Masco, Red Bank; Edward Joseph McNamara, Manalapan Township, Monmouth County; Arnold Chester McQuaide, Jr., Eatontown; Randolph John Pilc, Holmdel; Peter Stephen Warwick, Middletown, all of N.J.

[73] Assignee: Bell Telephone Laboratories, Incorporated, Murray Hill, N.J.

[22] Filed: Mar. 14, 1975

[21] Appl. No.: 558,488

[52] U.S. Cl. .................................... 179/18 EB
[51] Int. Cl.[2] .................... H04M 3/42; H04Q 3/42
[58] Field of Search .......... 179/18 EB, 18 E, 18 BG, 179/18 ES; 178/2 R, 3, 17.5, 4.1 R; 340/147 P

[56] References Cited
UNITED STATES PATENTS 3,347,993  10/1967  Warman et al. ................. 179/18 EB
3,735,051  5/1973  Harms ............................ 179/18 EB

*Primary Examiner*—Thomas A. Robinson
*Attorney, Agent, or Firm*—Roy C. Lipton

[57] ABSTRACT

A digital data switching system is designed for rapid calling of data machines by subscriber polling equipment. In the event, however, that calls cannot be completed due, for example, to busy conditions of called machines or to failure of machines to answer the calls, the polling equipment is precluded from rapidly initiating new calls that overload the common control equipment. A timing circuit delays the initiation of new calls by blocking requests for the services of the common control equipment if completion of the previous call is unsuccessful and the common control equipment is continuously active.

15 Claims, 3 Drawing Figures

CALL INITIATION DELAY ARRANGEMENT FOR DIGITAL DATA SWITCHING SYSTEM

FIELD OF THE INVENTION

This invention relates to common control switching systems wherein transmission lines share the services of common control equipment and, more particularly, to switching systems wherein transmission lines request the services of the common control equipment when calls are initiated by the transmission line subscribers.

DESCRIPTION OF THE PRIOR ART

Common control switching systems are characterized by control equipment which is fewer in number than the number of originating lines which may require service to extend calls to terminating lines. Accordingly, when a call is initiated by the calling subscriber, a request is made by the originating line circuit for the common equipment which, when obtained, provides services such as signaling the calling subscriber that it is ready to accept dialing or address information; accepting, storing and interpreting the address information to identify the terminating line of the called subscriber; and connecting the originating line to the terminating line if the latter is available or signaling the calling subscriber if the terminating line is busy. After providing these and other services, the common control equipment releases from the originating line to thus become available to other lines.

In the copending application of R. E. Cardwell, D. E. Carlson, R. L. Davis, E. J. McNamara, R. J. Pilc, G. G. Schlanger, D. M. Tutelman, P. S. Warwick and H. R. Zydney, Ser. No. 542,583, filed Jan. 20, 1975, there is disclosed a common control line switching system of this type especially arranged for data subscribers. In this system, a call is initiated by the data subscriber by the transmission of "off-hook" data signals. These signals are recognized by the subscriber line circuit which thereupon requests the services of a marker. The marker obtains an available digital register sender, connects the register sender to the originating line circuit by way of the switch and releases. The register sender now sends "dial tone" data signals back to the calling subscriber who, in turn, returns the address digits. After storing the digits, the register sender requests a marker, sending the address information to the marker. If the called party is busy, the marker signals the register sender and releases therefrom. The register sender now sends a "busy" code sequence back to the originator and releases from the switch. If the called party is available, the marker connects the called line to the register sender and the originating line and then releases from the register sender. The register sender now sends "ringing" data signals to the called party, sends "ringback" code sequences back to the originator and thereafter releases from the switch. The called subscriber, in response to "ringing", answers the call by sending "answer" data signals and the two parties thereafter intercommunicate. The common control equipment, namely the digital register sender and the marker, by releasing after providing each service function, is thereupon available to serve a plurality of subscribers.

The data switching system, disclosed in the R. E. Caldwell et al. application, provides establishment of the switching functions in a minimum of time and is therefore particularly suitable for serving the communication needs of data terminals sharing a central computer station wherein delay of call set may be costly. Advantageously, the central computer polls the data terminals, calling them in accordance with some pattern to determine whether they desire to communicate with the computer, accepting information from them if they desire to communicate and calling the next terminal in the pattern if they have no information to send. Alternatively, the next terminal in the pattern is also called if the terminal is busy with another call or does not respond to the call from the computer. In the event, however, that the calls cannot be completed to several stations, the central polling station rapidly runs through the polling pattern and this rapid calling tends to overload the common control circuitry, i.e., cause a condition whereby registers are not readily available to any calling party.

Accordingly, it is an object of this invention to correct overload situations in common control switching systems. It is a further object of this invention to deal with subscribers who rapidly initiate a plurality of calls that are not completed to the called subscribers.

SUMMARY OF THE INVENTION

In accordance with this invention, the originating line is precluded from requesting the common control equipment in response to the initiation of a call if the prior call was not completed to the called subscriber and the activity of the common control equipment exceeds a predetermined level. The request preclusion is maintained for an interval of time, delaying the initiation of the new call to overcome the overloading of the common control equipment.

It is a feature of this invention that the service requests of all of the calling lines are scanned. If the requests awaiting service are continuous, it is determined that the activity of the common control equipment exceeds the predetermined level.

It is another feature of this invention that completion of the call is recognized by the answering signals from the called subscriber. If, however, the calling subscriber abandons the call by going back "on-hook" without the answering signals being received, it is concluded that the call is not completed. Similarly, if the common control equipment abandons the attempt to interconnect the lines (whereby the answering signals are not received), it is concluded that the call is not completed. In either event, assuming that the common control equipment is continuously active, the request preclusion is maintained for the interval of time.

The foregoing and other objects and features of this invention will be more fully understood from the following description of an illustrative embodiment taken in conjunction with the accompanying drawings.

BRIEF DESCRIPTION OF THE DRAWINGS

In the drawings:

FIG. 2 shows in schematic form, the various circuits which form a load control circuit and a load detection circuit which cooperates with other components in the switching facility in accordance with this invention.

DETAILED DESCRIPTION

Figure 1:
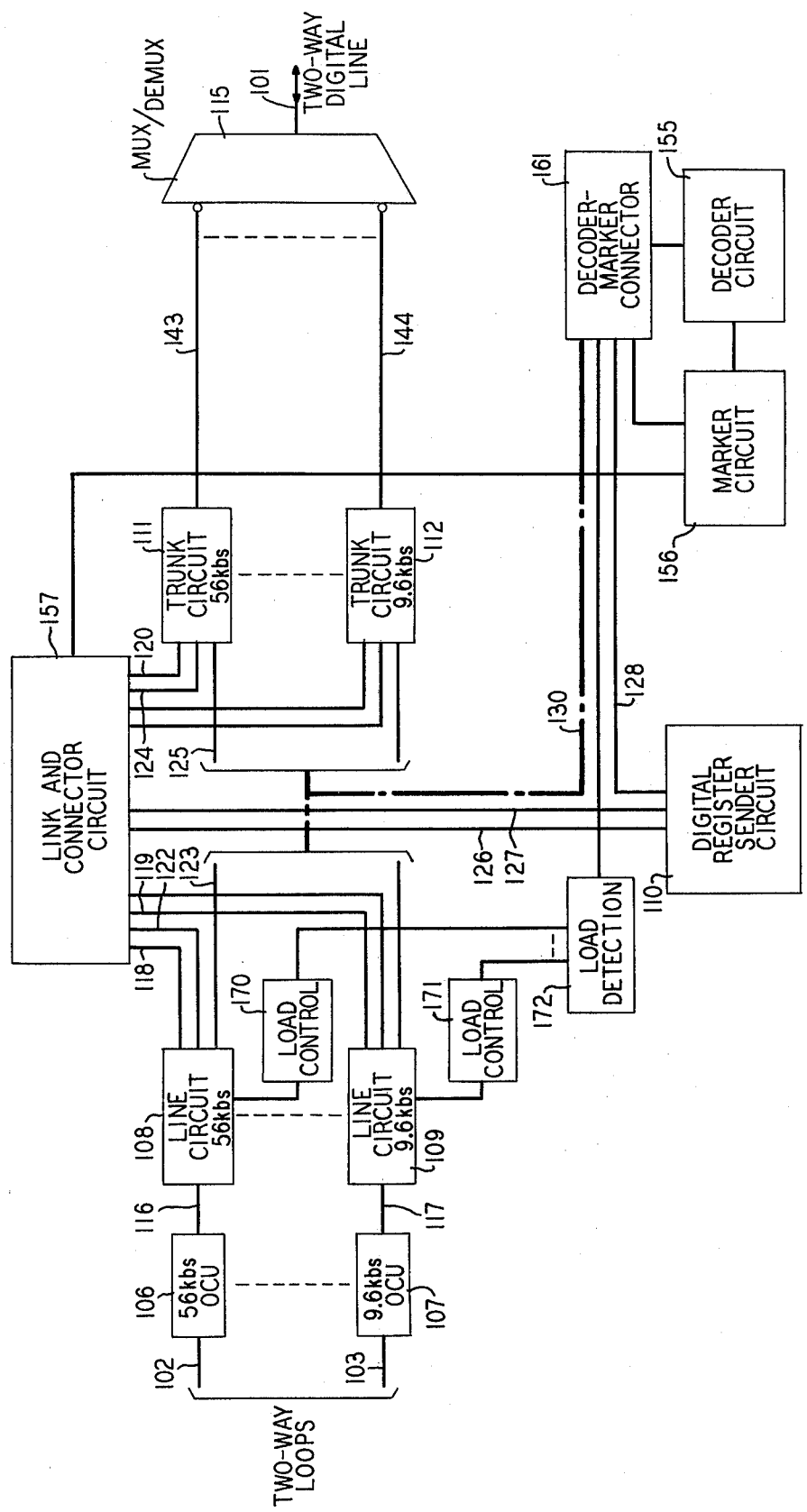
FIG. 1 discloses, in block form, a central office switching facility in accordance with this invention.

A switching office for line switching digital data messages is shown in FIG. 1. The switching office is connected by way of two-way loops, such as two-way loops 102 and 103, to digital data subscribers which have the capability of transmitting and receiving data characters. Each data subscriber (not shown) presents an "on-hook" signal to the two-way loop when not sending or receiving and presents an "off-hook" signal to the two-way loop when arranged to send and receive. A subscriber, such as a subscriber connected to two-way loop 102, may be arranged to signal at a signaling speed of 56 kbs (kilobits per second) or, if connected to a signal loop such as loop 103, may be arranged to signal at a signaling speed of 9.6 kbs. The switching office may also be connected to another switching office by way of a two-way digital transmission line such as line 101. Line 101 may be advantageously arranged to convey data streams of interleaved data at the speed of 1.54 megabits per second.

Two-way loop 102 which conveys data and data characters at 56 kbs per second is connected to an office channel unit, generally indicated by block 106, in the switching office. It is a function of the office channel unit to assemble the data and data characters into 8-bit bytes inserting a control bit in the 8-bit position. The office channel unit (OCU) is advantageously of the type disclosed in U.S. Pat. No. 3,794,768 issued to A. C. Carney, M. P. Cichetti, Jr., J. G. Kneuer and D. W. Rice on Feb. 26, 1974. Accordingly, the OCU inserts a 0 bit in the eighth bit position of the assembled byte when the data subscriber is "on-hook" to form a control mode byte and inserts a 1 in the eighth bit position when the subscriber is "off-hook" to form a data mode byte. A train of bytes is then passed to two-way transmission path 116 and, with the additional insertion of the control bit, the resulting signaling speed is at 64 kbs.

The OCU receives a stream of bytes from transmission path 116 at the 64 kbs speed, strips the control bit from the byte and passes the information bits as data characters on to two-way loop 102 to the data subscriber, the resulting speed being at 56 kbs. A 9.6 OCU, such as OCU 107, similarly assembles the data received from two-way loop 103 into 8-bit bytes inserting the appropriate control bit in the eighth bit position and additionally inserting a 0 bit in the first bit position to designate a subrate subscriber. The byte thus assembled is then repeated five times to achieve a signaling rate of 64 kbs and then passed on to lead 117. The data stream received by OCU 107 from two-way path 117 constitutes bytes repeated five times and the OCU, in addition to stripping the first and eighth bit, also selects one-out-of-five bytes and passes the information bits thus selected to two-way loop 103 whereby a data stream at the 9.6 kbs rate is transmitted to the data subscriber. The insertion and stripping of the bits and the repeating and selecting of the bytes are described in further detail in the A. C. Carney et al. patent.

The 1.54 megabits per second data stream received on digital line 101 is applied to multiplexer/demultiplexer 115. The multiplexer/demultiplexer 115 distributes the interleaved bits to a plurality of two-way trunk lines, two of the trunk lines being represented by lines 143 and 144. The resultant stream of data on the trunk line, such as trunk line 143, is at the signaling speed of 64 kbs. A multiplexer/demultiplexer which advantageously provides this demultiplexing operation is shown in the A. C. Carney et al. patent. 64 kbs data applied by a two-way trunk line, such as trunk line 143, is interleaved with data applied to multiplexer/demultiplexer 115 by other two-way trunk lines and passed on to two-way digital line 101 to provide a 1.54 megabit per second data stream which is then passed on to the remote office.

The switching function is generally provided by line circuits such as line circuit 108 (which is arranged for 56 kbs subscribers) and line circuit 109 (which is arranged for 9.6 kbs subscribers), the link and connector circuit 157, digital register sender circuit 110, marker circuit 156 and its associated decoder circuit 155 together with decoder marker connector 161 and trunk circuit 111 which is arranged for 56 kbs subscribers and trunk circuit 112 which is arranged for 9.6 kbs subscribers. It is understood that the switching office includes other line and trunk circuits as well as other register sender and marker/decoder circuits.

In general, link and connector circuit 157 includes a crossbar switch (not shown) to provide switching interconnections, which switching interconnections are generally determined by the marker/decoder (shown as marker circuit 156 and decoder circuit 155), the marker/decoder being connectable to the rest of the switching equipment in response to requests made to decoder marker connector circuit 161. The link and connector circuit, the marker circuit, the decoder circuit and the decoder marker connector circuit are advantageously arranged in substantially the same manner as similarly identified circuits described in U.S. Pat. No. 3,394,232 which issued to R. J. Jaeger, Jr. and G. Riddell on July 23, 1968.

The digital line circuit 108, the digital trunk circuit, such as trunk circuit 111, and the digital register sender circuit, such as digital register sender circuit 110, are arranged to send, receive, generate and interpret the digital data signals being conveyed by the two-way transmission lines such as line 116, and the two-way trunk lines, such as trunk line 143. The digital line circuit, the trunk circuit and the register sender are further arranged to cooperate with other equipment of the switch such as link and connector circuit 157, the decoder marker (155 and 156) and decoder marker connector 161. The digital line circuit (108 and 109), digital trunk circuit (111 and 112) and digital register sender circuit 110 are advantageously arranged in substantially the same manner as similarly identified circuits described in the copending application of R. E. Cardwell et al.

The above described circuits, interconnected as shown in FIG. 1, cooperate to form a data switching office which is described in detail in the copending application of R. E. Cardwell et al. In accordance with the present invention, the switching office further includes a load control circuit associated with each digital line circuit, such as load control circuit 170 associated with line circuit 108 and load control circuit 171 associated with line circuit 109 and includes load detection circuit 172 which is common to the several load circuits and is also connected to decoder marker connector 161.

Load detection circuit 172 monitors the requests made to decoder marker connector circuit 161 for the services of the decoder marker. More specifically, load detection circuit 172 samples conditions of decoder marker connector 161 and in the event that line circuits are being served by marker/decoders and further, in the event that this condition prevails for a predetermined interval of time, load detection circuit 172 signals the load control circuits that a condition of continuous activity prevails. Load detection circuit 172 thereafter continues to signal the continuous activity condition and continues to sample the operations of decoder marker connector 161. In the event that a marker/decoder becomes available and no line circuit is bidding for its services and further, in the event that this condition prevails for a predetermined interval of time, load detection circuit 172 removes the continuous activity indication sent to the load control circuits.

Each load control circuit (such as load control circuit 170) follows certain portions of the progress of a call being set up by way of its associated line circuit (such as line circuit 108). Load control circuit 170 initially recognizes a new call by detecting when a register sender is obtained by line circuit 108. Thereafter load control circuit 170 determines which of two events occur first, the events being the answer from the terminating subscriber and the "restoration" of the line circuit (due, for example, to releases of the register sender when it cannot complete the call or "hang-up" of the local originating subscriber). In the event that the answer is received first by line circuit 108, load control circuit 170 is "satisfied" that the call has been completed and restores to its initial condition and thereafter awaits the next call originated by the subscriber.

Assume, however, that the first event is the "restoration" of the line circuit indicating failure to complete the call. When line circuit 108 starts to "restore" by releasing from the link and returning to its "idle" mode, load control circuit 170 initiates the timing of an interval. In the event that a continuous activity condition exists (whereby a continuous activity signal is being received from load detection circuit 172), load control circuit 170 prevents line circuit 108 to fully restore to "idle" to the extent that it blocks the ability of line circuit 108 to request the services of a marker for the duration of the timed interval. At the end of the timed interval, load control circuit 170 removes its disabling signal, permitting line circuit 108 to restore to its idle condition, restoring in turn load control circuit 170 to its initial condition. The services of a marker may now be requested and a new call may therefore be initiated.

A portion of the general operation sequence necessary to the understanding of this invention is now described. Initially the line circuit, such as line circuit 108, is in the idle condition. In this idle condition, the line circuit is receiving control mode "idle" bytes from line 116 (that is, a byte designating the "on-hook" condition of the subscriber). At the same time, link and connector circuit 157 is sending over line 118 a stream of 0 bits to line circuit 108 simulating the transmission of a stream of control mode "NUL" bytes or characters. Line circuit 108 monitors the incoming bytes from line 116 and from line 118 and, with the "idle" "NUL" characters being received, sets itself in the idle mode.

Assume now that the subscriber goes "off-hook" to initiate a call. In this "off-hook" condition a stream of data mode characters is received by line circuit 108 from OCU 106. Advantageously, the subscriber sends "SYN" data characters which are assembled by the OCU into data mode bytes and sent on to line circuit 108. Line circuit 108 monitors (and counts) the data mode bytes and, in the event that the appropriate count is satisfied by the reception of a sufficient number of data mode characters, line circuit 108 proceeds to go "off-hook." In going "off-hook" line circuit 108 makes a bid for a marker by providing a bidding signal by way of control leads 123 and decoder marker connector circuit 161.

When a marker is obtained, it connects to line circuit 108 by way of link and connector circuit 157. The line circuit thereupon supplies its class mark to the marker and supplies hold ground for the hold magnets of the crossbar switch of the link and connector circuit 157 to thereby connect to the link. The marker then obtains a register sender such as digital register sender circuit 110, connects the register sender to line circuit 108 by way of link and connector circuit 157 and thereupon releases. The register sender, after monitoring the "SYN" characters passed by line circuit 108, returns "CSA" (dial tone) control bytes back to line circuit 108 by way of link and connector circuit 157.

Line circuit 108 monitoring transmission path 118 counts the "CSA" bytes and, when satisfied, passes the "CSA" bytes to OCU 106 which, in turn, sends the "dial tone" characters to the subscriber. In addition, when line circuit 108 is satisfied by the count, it signals load control circuit 170 that a register sender has been obtained. The subscriber now proceeds to send address characters defining the desired addressee subscriber. These address characters, appropriately assembled by OCU 106, are passed to line circuit 108 which, in turn, repeats the address characters through transmission line 118 to digital register sender circuit 110.

Digital register sender circuit 110 determines if the format and parity of the address characters are correct and then requests the services of a decoder/marker by way of control leads 128 and decoder marker connector circuit 161. When a decoder/marker is obtained, digital register sender circuit 110 sends the address digits (converted into a 2/5 format) via the decoder marker connector circuit 161. The decoder/marker thereupon locates the terminating line circuit (or trunk circuit) defined by the address digits and determines if the terminator is idle or busy.

In the event that the terminating circuit is busy, the decoder/marker returns a busy indication by way of control leads 128 and releases. The register sender generates and transmits a "busy" call progress code sequence which is passed back through line circuit 108 to the originating data subscriber. The register sender thereafter releases from link and connector circuit 157 which thereafter sends "NUL" characters to line circuit 108. The line circuit now counts the "NUL" characters and, if satisfied, starts to restore to the initial "idle" condition, signaling load control circuit 170 that it is "restoring" and releasing from the link. It is, of course, presumed that the subscriber thereafter restores to the "on-hook" condition upon receiving the "busy" indication.

If there is no overload condition, load control circuit 170 does not block the "restoration" and line circuit 108 returns to the "idle" mode, permitting the request for a marker if a new call is initiated by the subscriber. In the event, however, that there is an overload signal from load detection circuit 172, load control circuit 170 recognizes the failure to complete the call and initiates the timed interval, precluding the full restoration to "idle" by line circuit 108 by blocking the ability to request a marker. At the termination of the timed interval, the blockage is removed, line circuit 108 returns to "idle" and a new call may be initiated.

Assume now that the terminating line circuit is available (not busy). The decoder/marker thereupon connects the terminating line circuit to the crosspoints of link and connector circuit 157 which is in turn connected to digital register sender circuit 110 and line circuit 108 thereby interconnecting the originator, the terminator and the digital register sender. In addition, the decoder/marker informs the register sender by way of control leads 128 that the terminating line circuit is now connected and then releases.

Upon being advised that the terminating line circuit is idle and connected, the register sender initiates the generation of packets of "BEL" characters, sending these characters by way of link and connector circuit 157 to the terminating line circuit. The terminating line circuit in response to the "BEL" characters sends "CME" characters to the terminating subscriber to advise him that he is being rung.

In the event that the terminator answers the call, it advantageously answers by the transmission of an answer packet which constitutes a plurality of data mode "ANS" characters. This answer packet is converted by the terminating line circuit to a predetermined number of data mode "ANS" characters and a terminal "CTC" (cut through) character, all of which are sent through link and connector circuit 157 to originating line circuit 108. The originating line circuit 108 monitors the answer packet and, when satisfied, signals load control circuit 170 that the call between the subscribers has been completed. The originator and terminator proceed to communicate with each other and at the termination of the call, one or the other of the subscribers "hangs up." The line circuit of this subscriber disconnects from the link sending "NUL" characters to the switch. The other line circuit in response to the "NUL" characters also disconnects from the link. In this manner all of the circuits involved in the call disconnect and restore to idle in response to one or the other of the subscribers "hanging up."

Assume now that the terminating subscriber fails to answer the call. The originator, realizing that the call is not being answered, "hangs up." Line circuit 108 recognizes the "on-hook" characters from the subscribers and, upon being satisfied by the reception of a sufficient number, starts to restore to the initial "idle" condition, signaling load control circuit 170 that it is "restoring" and releasing from link and connector circuit 157. If there is no continuous activity condition, line circuit 108 is permitted to fully restore to the "idle" condition. In the event, however, that there is a continuous activity condition, load control circuit 170 initiates the timed interval and, as previously described, line circuit 108 is precluded from fully restoring thereby blocking the ability of requesting services of a marker for the timed interval.

Figure 3:
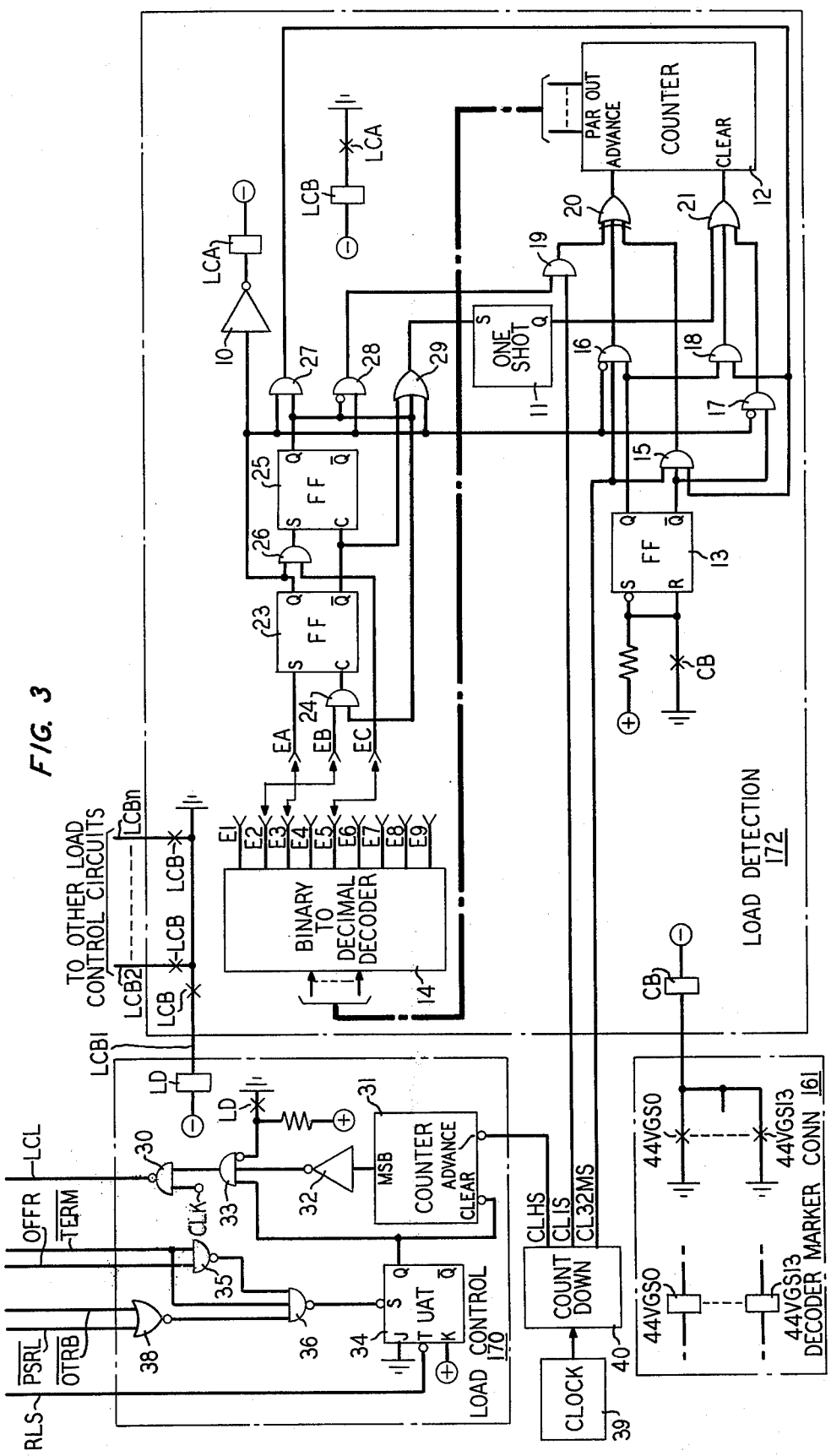
FIG. 3, when aligned below

Monitoring of the decoder marker circuit 161 is provided by relay CB of load detection circuit 172 as seen in FIG. 3. More specifically, the operating path of relay CB extends through parallel paths to ground by way of contacts such as contacts 44VGS0 through 44VGS13. Each of the contacts are controlled by corresponding relays 44VGS0 through 44VGS13, correspondingly identified relays being shown in FIG. 44 of the previously identified R. J. Jaeger, Jr. et al. patent. As described in the R. J. Jaeger, Jr. et al. patent, one or the other of relays 44VGS0 through 44VGS13 are operated when a line circuit requests the services of a marker and is maintained operated until the marker is released. During that interval, ground is applied through the make contacts of the associated relay to the operating path of relay CB. Relay CB accordingly is operated designating that the marker decoder circuit is serving a line circuit.

The operation of relay CB extends ground to the R input of flip-flop 13. This ground, inverted, is also applied to the S input of flip flop 13. With relay CB released, the ground is removed and positive battery is passed to the R input and the inversion thereof applied to the S input. Thus, when a decoder/marker is serving a line circuit and relay CB is operated, flip-flop 13 is "set" whereas, when no line circuit is being served, flip-flop 13 is "cleared."

The "scanning" of the condition of flip-flop 13 is provided by a clock pulse passed to lead CL32MS by countdown circuit 40. Countdown circuit 40, in turn, is driven by high-speed clock 39. The clock pulses from clock 39 are divided down by countdown circuit 40 to provide three outputs, namely outputs CL1S, CL32MS and CLHS. The degree of the countdown is such that a clock pulse having a pulse per second rate is passed to lead CL1S, a clock pulse having a pulse per 32 milliseconds rate is passed to lead CL32MS and a clock pulse having a pulse per one-half second rate is passed to lead CLHS.

In the initial idle condition, as described hereinafter, flip-flop 23 and flip-flop 25 are in the "clear" condition. In this condition flip-flop 23 applies a low potential from its Q output to gates 26, 27 and 28, disabling these three gates. This low condition is passed, inverted, to partially enable gate 16 and gate 17. Gate 27 disabled applies, in turn, a low condition to gates 15 and 18 and these latter two gates are disabled.

Assume now that no marker decoder is serving a line circuit. Flip-flop 13 is "clear" and a high condition is provided at the $\overline{Q}$ output. This high condition is passed through gate 17 and through OR gate 21 to the "clear" input of counter 12. Counter 12 is thus cleared to its initial count.

Assume now that a line circuit requests the services of a decoder/marker. Flip-flop 13 is placed in the "set" condition, as previously described. The consequent low condition on output terminal $\overline{Q}$ disables gate 17 to remove the clear clamp from counter 12. At the same time terminal Q partially enables gates 16 and 18. Gate 16 is fully enabled by the 32 millisecond clock pulse on lead CL32MS and passes this pulse through exclusive OR gate 20 to the advance input of counter 12.

In the event that, during the counting operation, the decoder/marker serves the line circuit and releases and no further decoder/markers are required by the line circuits, then flip-flop 13 returns to the "clear" condition. Gate 16 is again disabled, terminating the advance of counter 12. At the same time gate 17 is reenabled and counter 12 is again cleared to the initial count.

Assume now that a plurality of line circuits are requesting the services of the decoder/marker and that the marker decoders are therefore serving the line circuits for a continuous period to create an overload condition. In this event, flip-flop 13 is maintained "set," gate 16 is maintained enabled and the 32 millisecond pulse train is continuously passing therethrough and through exclusive OR gate 20 to the advance terminal of counter 12. Counter 12 is therefore continuously advanced and, after a predetermined interval of time which may advantageously be approximately four seconds, counter 12 reaches a count recognized by binary-to-decimal decoder 14. Binary-to-decimal decoder 14 thereupon energizes output terminal E3, applying a high potential to the S input of flip-flop 23.

The setting of flip-flop 23 provides a high potential to output terminal Q. This high potential inverted by inverter 10, operates relay LCA. Relay LCA, in turn, operates relay LCB and relay LCB operated closes its various make contacts to apply ground to leads LCB1 through LCB$n$. This ground is passed to each load control circuit such as load control circuit 170 to indicate a continuous activity condition.

The setting of flip-flop 23 also partially enables gates 26, 27 and 28, disables gates 16 and 17. Also, OR gate 29 is enabled and activates the one-shot 11, enabling OR gate 21 that clears counter 12 to its initial state. Flip-flop 25, normally "cleared", applies the low potential at its output terminal Q, inverted, to gate 28 to thereby fully enable the gate. With gate 28 fully enabled, the high output partially enables gate 19. The other input to gate 19 is connected to clock lead CL1S. The one second clock pulse is thereby passed through gate 19 and exclusive OR gate 20 to the advance input of counter 12. Counter 12 is thereby advanced until it reaches a second predetermined count. This second predetermined count which may advantageously be approximately 45 seconds is recognized by binary-to-decimal decoder 14 energizing output terminal E5. A high potential is thereby applied to gate 26 fully enabling the gate and "setting," in turn, flip-flop 25.

The "setting" of flip flop 25 fully enables gate 27, partially enables gate 24 and disables gate 28. In addition, the high potential at the Q output of flip-flop 25 is passed through OR gate 29 to fire one-shot multivibrator 11. The consequent output of multivibrator 11 is passed through OR gate 21 to clear counter 12 to its initial count. With gate 28 disabled gate 19 is, in turn, disabled precluding further advance of counter 12 with the CL1S clock. With gate 27 enabled, gates 15 and 18 are partially enabled.

If the decoder/markers are still serving the line circuits, flip-flop 13 is still "set" and the high potential at its Q output now fully enables gate 18 which passes a high potential through OR gate 21 to clamp counter 12 to its initial count. This condition is maintained so long as the decoder/markers continue to serve line circuits for an uninterrupted period of time.

Assume now that all line circuits have been served. Flip-flop 13 is again "cleared" to disable gate 18, removing the clear clamp from counter 12. Flip-flop 13, cleared, also fully enables gate 15 and the 32 millisecond clock pulse is passed therethrough and through exclusive OR gate 20 to again advance counter 12. In the event that, during the counting operation, a line circuit makes a request for service of the decoder/marker, then flip-flop 13 returns to the "set" condition. Gate 15 is again disabled terminating the advance of counter 12. At the same time gate 18 is reenabled and counter 12 is again cleared to the initial count.

Assume now that the service of the decoder/marker is not required for an extended time interval. When a third predetermined count, which may advantageously be approximately one second, is achieved and recognized by binary-to-decimal decoder 14, it energizes output terminal E2. This potential is passed through gate 24 to "clear" flip-flop 23. Flip-flop 23, "cleared", releases relay LCA, which in turn, releases relay LCB to terminate the signaling of the overload condition to the load control circuits. Flip-flop 23 "cleared" also passes a positive transition through OR gate 29 to fire one-shot multivibrator 11 thereby clearing counter 12 to its initial count. Finally, flip-flop 23 "clears," in turn, flip-flop 25 and with the two flip-flops "cleared," load detection circuit 172 is returned to its initial condition.

Figure 2:
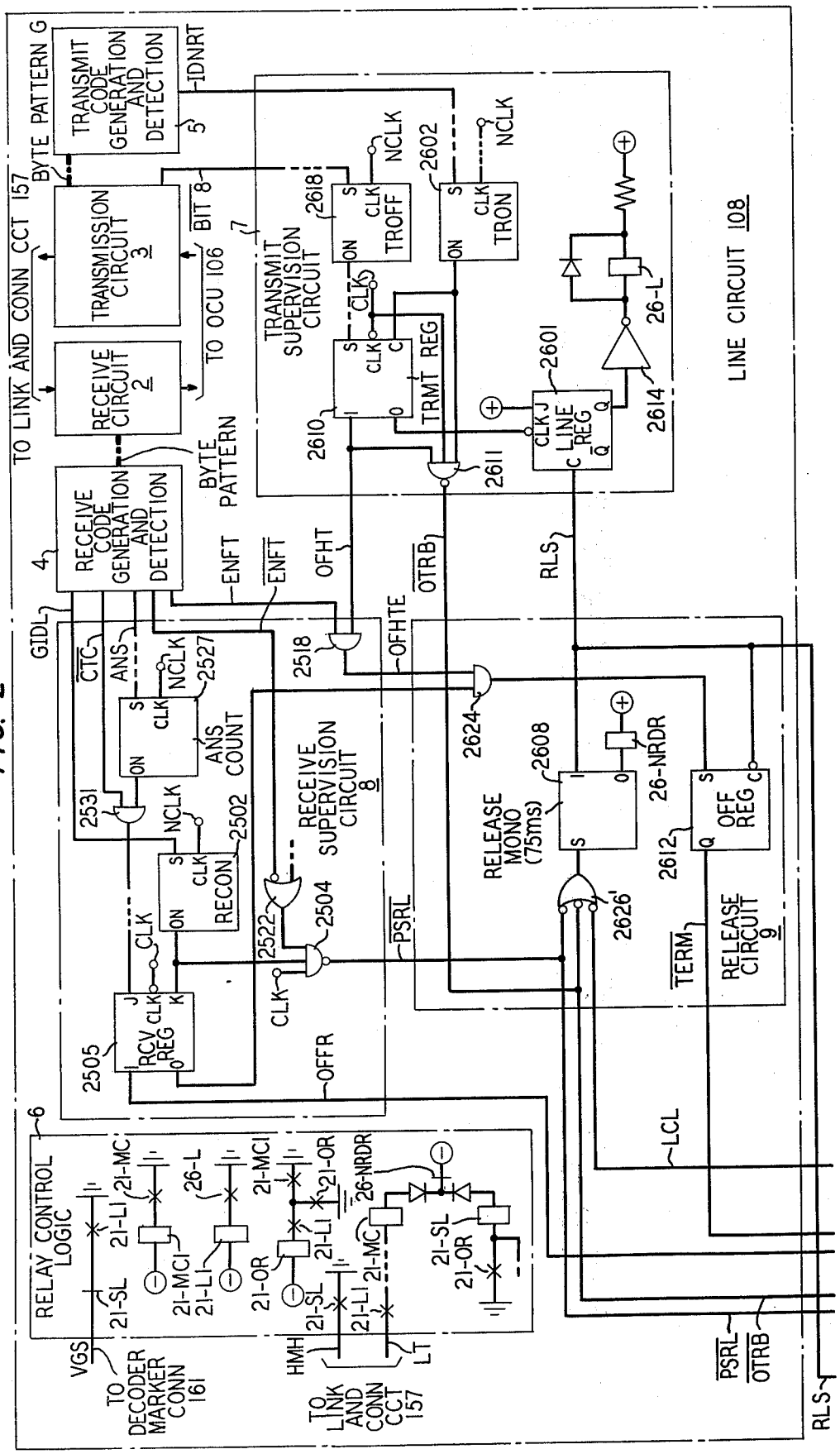
FIG. 2 shows, in schematic form, those various circuits in a digital line circuit necessary to understand this invention.

FIG. 2 discloses portions of line circuit 108 in sufficient detail to understand this invention. The full detail of the circuitry of line circuit 108 and a complete description of its operation is obtainable from the copending application of R. E. Cardwell et al.

General components of line circuit 108 comprise receive circuit 2, shown in detail in FIG. 21 of the R. E. Cardwell et al application; transmission circuit 3, shown in FIG. 21; receive code generation and detection circuit 4, shown in FIG. 24; transmit code generation and detection circuit 5, shown in FIG. 22; relay logic control circuit 6, shown in FIG. 21; transmit supervision circuit 7, shown in FIG. 26; receive supervision circuit 8, shown in FIG. 25; and release circuit 9, shown in FIG. 26 of the R. E. Cardwell et al application. Specific components in these circuits and the interconnecting leads when shown in FIG. 2 are similarly identified in the R. E. Cardwell et al application.

When the subscriber goes "off-hook," the data mode "SYN" character received from OCU 106 is applied to transmission circuit 3. The parallel bits of the byte are passed to cable BYTE PATTERN G and, since the byte is a data mode byte, lead $\overline{\text{BIT}}$ 8 is periodically pulsed at the byte rate. Lead $\overline{\text{BYTE}}$ 8 extends to the S input of TROFF flywheel counter 2618 in transmit supervision circuit 7. As described in detail in the R. E. Cardwell et al application, TROFF flywheel counter 2618 is clocked by an NCLK pulse which occurs every $n^{th}$ byte. If a data mode byte is being received, TROFF flywheel counter 2618 is satisfied and, if $n$ successive data mode bytes are received, TROFF flywheel is fully satisfied raising the potential on output terminal ON. This, in turn, applies a high potential to the S input terminal of TRMT flip-flop 2610. Flip-flop 2610 is thereupon clocked to the "set" condition by a byte rate clock pulse.

In the "set" condition TRMT flip-flop 2610 applies a high potential to lead OFHT partially enabling gate 2518 in receive supervision circuit 8 and partially enabling gate 2611. At the same time, the setting of TRMT flip-flop 2610 provides a negative transition at its 0 output and this transition, inverted, is passed to the "CLK" input of LINE flip-flop 2610, toggling this latter flip-flop to the "set" condition. The "setting" of LINE flip-flop 2610 passes a high potential, inverted by inverter 2614, to relay 26-L, operating the relay. The operation of relay 26-L operates relay 21-L1 in relay control logic 6. Relay 21-L1 operated extends ground through break contacts of relay 21-SL to terminal VGS which is connected to decoder marker connector 161. The application of this ground to decoder marker connector 161 provides the function of requesting a marker.

When a marker is obtained, it provides a momentary ground by way of link and connector circuit 157 and lead LT, which ground is then passed through make contacts of relay 21-L1, the core of relay 21-MC and break contacts of relay 26-NRDR to negative battery momentarily operating relay 21-MC. The momentary operation of relay 21-MC momentarily operates, in turn, relay 21-MC1 to complete an operating path for relay 21-OR which locks through make contacts of relay 21-L1. Relay 21-OR, operated, completes an operating path for relay 21-SL. The operation of relay 21-SL extends ground to lead HMH to provide holding ground for the hold magnets in link and connector circuit 157 thereby connecting line circuit 108 to the switch.

When relay 21-MC operates, the line circuit supplies its class mark to the marker, as described in detail in the R. E. Cardwell et al application. The marker now obtains a register sender, connecting the register sender to the line circuitry by way of the link and connector circuit and the marker thereupon releases.

At this time the data mode "SYN" characters from the subscriber are being passed through transmission circuit 3 to link and connector circuit 157. The register sender, after monitoring the "SYN" characters, returns "CSA" (dial tone) characters, which characters are received by receive circuit 2 from link and connector circuit 157. The parallel bits of the "CSA" characters are applied to lead BYTE PATTERN and passed to receive code generation and detection circuit 4, which circuit monitors the parallel bits and, when satisfied that an appropriate number of "CSA" characters are received, applies a high potential to lead ENFT and a low potential to lead $\overline{ENFT}$. The high potential fully enables gate 2518 passing a high potential to lead OFHTE which partially enables gate 2624 in release circuit 9. At this time, RCV flip-flop 2505, in receive supervision circuit 8, is in the "clear" condition. A high potential at its 0 output terminal is thereupon applied to lead OHNR. Gate 2624 is therefore fully enabled, "setting" OFF flip-flop 2612. The "setting" of OFF flip-flop 2612 passes a high potential to lead $\overline{TERM}$ and this high potential is passed to load control circuit 170 advising the load control circuit that a register sender has been obtained.

The "CSA" characters are also passed by receive circuit 2 to OCU 106 and the OCU, in turn, sends the "dial tone" characters to the subscriber. The subscriber now proceeds to send the address digits which are passed through transmission circuit 3 to the register sender. As previously described, the register sender requests the services of a marker to connect the terminating line circuit of the addressee subscriber to the switch to thereby connect the register sender and originating line circuit to the terminating line circuit.

Assume first that the terminating line circuit is available. The register sender now sends ringing signals to the addressee subscriber. Further assume that the addressee subscriber answers the call. In this event, the addressee subscriber sends "ANS" (answer) characters to the terminating line circuit, which assembles these characters into an answer packet which is returned to the originating line circuit 108. The "ANS" characters in the answer packet are first received by receive circuit 2 and the bite thereof are passed by cable BYTE PATTERN to the receive code generation and detection circuit 4. This circuit, in turn, pulses lead ANS (at the byte rate), passing the pulses to the S input terminal of ANSWER COUNT flywheel 2527. ANSWER COUNT flywheel 2527, having been clocked by the NCLK pulse, is satisfied after $n$ bytes are received, raising the potential on its output terminal ON to partially enable gate 2531. Thereafter, the "cut-through" character, which terminates the answer packet, is received and receive code generation and detection circuit 4 applies an enabling potential to lead CTC to fully enabled gate 2531. This passes a high potential to the J input of RCV flip-flop 2505 and the flip-flop is clocked to the "set" condition by a clock pulse which is at the byte rate.

The "setting" of RCV flip-flop 2505 applies a high potential to lead OFFR to signal load control circuit 170 that the answer packet has been received and that the call has therefore been fully cut through. The two subscribers thereupon communicate and, at the end of the call, the two subscribers "hang up."

In the event that the originating subscriber "hangs up" first, the "on-hook" characters now received from the OCU and passed to transmission circuit 3 are monitored by transmit code generation and detection circuit 5 by way of cable BYTE PATTERN G. Transmit code generation and detection circuit 5 recognizes the "on-hook" characters and pulses lead IDNRT at the byte rate.

Lead IDNRT extends to the S input of TRON flywheel 2602. The flywheel, clocked at the NCLK rate, is therefore satisfied after the reception of $n$ "on-hook" characters raising the potential on output terminal ON. This high potential fully enables NAND gate 2611 and is also applied to the C input terminal of TRMT flip-flop 2610. The next (byte) clock pulse is now passed through gate 2611 to lead $\overline{OTRB}$ and the terminal portion of the clock pulse "clears" TRMT flip-flop 2610. The pulse on lead $\overline{OTRB}$ indicates to load control circuit 170 that the originating subscriber has "hung-up." The pulse on lead $\overline{OTRB}$ is also passed through OR gate 2626 which corresponds to OR gate 2626 in the R. E. Cardwell et al. application, differing only in that an additional input lead LCL is provided to the input of the OR gate. In either case, however, the pulse on lead $\overline{OTRB}$ is passed through OR gate 2626' to the S input of release monopulser 2608 and the positive transition thereof operates the monopulser to provide during the operation a positive potential at the terminal 1 output and to provide a negative potential at the 0 output. The positive potential is passed to lead RLS to "clear" LINE flip-flop 2601 and, at the termination thereof, to "clear" OFF flip-flop 2612. The terminal portion of the positive potential on lead RLS also advises load control circuit 170 that the line circuit is restoring to its initial condition.

As described hereinafter, the negative potential at the 0 output terminal of release monopulser 2608 momentarily operates relay 26-NRDR and the operation of this relay opens the operating path for relay 21-SL. The release of relay 21-SL removes holding ground from lead HMH to release the line circuit from the switch. At the same time, the clearing of LINE flip-flop 2601 releases relay 26-L releasing, in turn, relays 21-L1 and 21-OR returning line circuit 108 to its initial idle condition.

In the event that the remote terminating subscriber goes back "on-hook" first, "NUL" characters are received from link and connector circuit 157. These characters are passed to receive circuit 2 and the parallel bits are passed by way of cable BYTE PATTERN to receive code generation and detection circuit 4 which pulses lead GIDL at the byte rate. The pulses on lead GIDL are passed to the S input terminal of RECON flywheel 2502. This flywheel, which is pulsed at the NCLK rate, is satisfied after $n$ bytes are received and applies a high potential to output terminal ON. This high potential fully enables gate 2504 and is also passed to the K input of RCV flip-flop 2505. The byte clock is now passed through gate 2504 to lead $\overline{PSRL}$ and the pulse on this lead passes through OR gate 2626' to operate release monopulser 2608. The pulse on lead PSRL is also passed to load control circuit 170 to advise the circuit that the line circuit is now receiving "NUL" characters from the switch. At the same time, the termination of the clock pulse also clocks RCV flip-flop 2505 back to the "clear" condition. The operation of relay monopulser 2608 now restores line circuit 108 to its initial condition releasing the line circuit from the switch in the same manner as previously described.

Assume now that the remote terminating subscriber fails to answer the call in response to the ringing signals. The originating subscriber, realizing that the call is not being answered, presumably "hangs up". "On-hook" characters are thereupon transmitted to the originating line circuit and received in transmission circuit 3. The parallel bits of the "on-hook" characters are passed by way of cable BYTE PATTERN G to transmit code generation and detection circuit 5 which, upon recognizing the "on-hook" characters, pulses lead IDNRT at the byte clock rate.

Lead IDNRT is connected to the S input of TRON flywheel 2602. The flywheel, which is clocked by the NCKL pulse, is satisfied by the reception of $n$ "on-hook" characters and applies a high condition to output terminal ON. This high condition is passed to the C input terminal of TRMT flip-flop 2610 and to NAND gate 2611 enabling the gate. The next clock pulse is thereupon passed through gate 2611 to lead $\overline{OTRB}$ and this pulse is passed to load circuit 170 to advise the circuit that the local originating subscriber has "hung-up" and, in addition, the pulse is passed through OR gate 2626' to operate release monopulser 2608. At the termination of this pulse, TRMT flip-flop 2610 is clocked to the "clear" condition.

The operation of release monopulser 2608 now initiates the restoration of line circuit 108 to the "idle" condition starting with the "clearing" of LINE flip-flop 2601 and the operation of relay 26-NRDR to disconnect the line circuit from the switch.

Referring now to FIG. 3, it is recalled that the potential on lead $\overline{TERM}$ went high when a register sender is obtained. The high potential on lead $\overline{TERM}$ partially enables NAND gates 35 and 36 in load control circuit 170. Thereafter, if the call is answered by the remote subscriber, the potential on lead OFFR goes high. Gate 35 is thereby fully enabled, disabling gate 36.

In the initial condition, UAT flip-flop 34 is in the "clear" condition. Output terminal Q thereupon provides a low condition to disable gate 33 disabling, in turn, gate 30. This low condition, inverted, also clears counter 31 to maintain the count in its initial count state. With gate 30 disabled, the potential on lead LCL is held high precluding application of input pulses to release monopulser 2608 through OR gate 2626' in release circuit 9. Thus, in a normal call answered by the remote subscriber load control circuit 170 is maintained in its initial condition and provides no pulsing input to release circuit 9.

Assume now that the terminating subscriber fails to answer the call and the originating subscriber abandons the call by going "on-hook." A pulse is now applied to lead $\overline{OTRB}$. This pulse passes through NOR gate 38. Since lead $\overline{TERM}$ is high in response to the obtaining of a register sender and the output of gate 35 is high in the absence of a response from the terminating subscriber, gate 36 is fully enabled passing the pulse from NOR gate 38 to the S input of UAT flip-flop 34. Flip-flop 34 is thereupon "set" removing the "clear" clamp from counter 31 and partially enabling gate 33. A second input to gate 33 is connected to positive battery, inverted, to normally disable the gate. In the event, however, that an overload condition prevails, ground is on lead LCB1, as previously described, operating relay LD. The positive battery is thus removed by shunting ground applied by way of make contacts of relay LD. This lower potential, inverted, further enables gate 33. The third input to gate 33 is connected by way of inverter 32 to the "most significant bit" output of counter 31. Since counter 31 is in the initial count, the most significant bit is obviously 0 and the consequent low potential, inverted, fully enables gate 33. This, in turn, enables gate 30 which passes a clock pulse at the byte rate to lead LCL. The pulse on lead LCL is, therefore, passed through OR gate 2626' to release monopulser 2608. The pulse interval of this clock pulse is substantially shorter than the operating period of release monopulser 2608. Consequently, the repeated application of this pulse maintains release monopulser 2608 in its operated timing condition. As a consequence, relay 26-NRDR is maintained operated, LINE flip-flop 2601 is maintained clamped in the "clear" condition and relay 26-L is maintained released. Since relay 26-L is maintained released, relay 21-L1 cannot operate, ground cannot be applied to lead VGS and the services of the marker cannot be required in response to the initiation of a new call.

Returning now to load control circuit 170, with the "clear" clamp removed from counter 31, it is advanced by the clock pulse on lead CLHS which, as previously described, is at the one-half second rate. Counter 31 therefore advances until it reaches a count where the most significant bit becomes a 1 bit. The high potential output of counter 31, inverted, thereupon disables gate 33 disabling, in turn, gate 30. This blocks the passage of clock pulses to lead LCL and release monopulser 2608 is permitted to time out. Relay 26-NRDR thereupon releases, the "clear" clamp is removed from LINE flip-flop 2601 and OFF flip-flop 2612 is cleared, as previously described. The clearing of flip-flop 2612 applies a low potential to lead $\overline{TERM}$ and this low potential now disables gates 35 and 36. The time out of release monopulser 2608 also provides a negative transition to lead RLS which clocks UAT flip-flop 3440 to the "clear" condition restoring load control circuit 170 to its initial condition.

Summarizing the operation of load control circuit 170, when a register sender is obtained, lead $\overline{TERM}$ goes high to enable gate 36. If the terminating subscriber answers the call, the potential on lead OFFR goes high enabling gate 35 which, in turn, disables gate 36. In the event, however, that the originating subscriber goes back "on-hook" in the absence of an answer from the terminating subscriber, lead OFFR remains low and a pulse is applied to lead $\overline{OTRB}$. This "sets" flip-flop 34 which enables gate 33. In the absence of an overload condition, gate 33 is maintained disabled disabling, in turn, gate 30 and the pulse on lead $\overline{OTRB}$ operates release monopulser 2608 which thereafter times out to restore line circuit 108 to the initial condition. If there is an overload condition, however, gate 33 is enabled, enabling gate 30 to apply pulses to lead LCL whereby release monopulser 2608 is maintained operated. Line flip-flop 2601 is therefore clamped in the "clear" condition. Under this condition, relay 26-L cannot operate, ground cannot be passed to lead VGS and a marker cannot be requested. Counter 31 now defines a time period and at the termination disables gate 33. This permits release monopulser 2608 to time out, remove the "clear" clamp from LINE flip-flop 2601 and restoring line circuit 108 to its initial condition, permitting the request of the services of a marker when the subscriber initiates a call.

Assume now that the terminating circuit is busy when called. The register sender thereupon returns the "busy" call progress code sequence to the originating line circuit and thereafter releases. "NUL" characters are thereupon received from the switch by receive circuit 2. When receive code generation and detection circuit 4 recognizes the "NUL" characters, lead GIDL is pulsed at the byte rate. When RECON flywheel 2502 is satisfied that $n$ "NUL" characters have been received, it applies a high condition to the K input of RCV flip-flop 2505 and fully enables gate 2504. The byte clock thereupon passes through gate 2504 to pulse lead $\overline{PSRL}$. This pulse is passed to load control circuit 170 to advise it that the remote equipment on the other side of the switch has released. In addition, the pulse on lead $\overline{PSRL}$ is passed through OR gate 2626' to operate release monopulser 2608. Line circuit 108 thereupon starts to restore to the initial condition. The pulse on lead $\overline{PSRL}$ also passed through NOR gate 38 to gate 36. Since the terminating subscriber has not answered the call, gate 36 is enabled, as previously described, and the pulse on lead $\overline{PSRL}$ is passed therethrough to "set" UAT flip-flop 34. With UAT flip-flop 34 "set," gate 33 is enabled if there is an overload condition. Gate 30 is thereupon also enabled passing the clock pulse to lead LCL to maintain release monopulser 2608 operated and to preclude initiation of a new call for the timed interval. Counter 31 now advances, as previously described, until the count is achieved where the most significant bit is a 1 bit. Gate 33 is thereupon disabled, disabling in turn gate 30 and terminating the operation of release monopulser 2608. Line circuit 108 is thereupon permitted to return to the "idle" condition enabling the requesting of a marker when the subscriber initiates a call.

Although a specific embodiment of this invention has been shown and described, it will be understood that various modifications may be made without departing from the spirit of this invention.

We claim:

1. In a switching system including transmission lines extending to subscribers, common control equipment for providing the service of extending calls from calling ones of the lines to called ones of the lines and means responsive to call initiating signals from each calling line for requesting the service of the common control equipment, the common control equipment being released from the calling line after each service attempt, characterized by
means jointly responsive to activity of the common control equipment exceeding a predetermined level within the activity capacity of the equipment and to each service attempt which fails to complete a call to a called line subscriber for rendering the calling line requesting means unresponsive to the call initiating signals.

2. In a switching system in accordance with claim 1, wherein the rendering means includes means responsive to the service requests of all of the calling lines for determining the activity of the common control equipment.

3. In a switching system in accordance with claim 2, wherein the determining means includes means responsive to continuous requests for a predetermined interval of time for indicating activity exceeding the predetermined level.

4. In a switching system in accordance with claim 1, wherein the rendering means includes timing means for rendering the calling line requesting means unresponsive for an interval of time.

5. In a switching system in accordance with claim 4, wherein the rendering means includes means responsive to answering signals from the called subscriber for indicating the completion of the call.

6. In a switching system in accordance with claim 5, wherein the rendering means includes means responsive to abandonment of the call by the calling subscriber in the absence of the indication of the completion of the call for enabling the timing means.

7. In a switching system in accordance with claim 6, wherein the means responsive to abandonment of the call by the calling subscriber includes means for detecting reception of "on-hook" signals from the calling subscriber.

8. In a switching system in accordance with claim 5, wherein the rendering means includes means responsive to predetermined signals from the common control equipment in the absence of the indication of the completion of the call for enabling the timing means.

9. In a switching system in accordance with claim 8, wherein the means responsive to predetermined signals includes means for detecting reception of signals from the common control equipment designating abandonment of the attempt to extend the call to the called line.

10. In a switching system for completing calls from originating lines extending to calling data subscribes to terminating lines extending to called data subscribers including
common control equipment for interconnecting the originating and the terminating lines,
means responsive to call initiating signals from each calling subscriber for requesting connection to the common control equipment, the common control equipment being released from the connection after each interconnection attempt, and
means jointly responsive to activity of the common control equipment exceeding a predetermined level within the activity capacity of the equipment and to abandonment of the interconnection attempt by the calling subscriber before completion of the call to the called subscriber for disabling the originating line requesting means.

11. In a switching system, in accordance with claim 10, wherein the called subscriber sends "answer" data signals to indicate completion of the call, the calling subscriber sends "on-hook" data signals to indicate abandonment of the interconnection attempt and the disabling means includes means responsive to the "on-hook" data signals from the calling subscriber in the absence of "answer" data signals from the called subscriber for operating the disabling means.

12. In a switching system, in accordance with claim 11, wherein the common control equipment sends digital data signals to the originating line in response to the connection thereto and the disabling means further includes means responsive to the digital data signals for enabling the operating means.

13. In a switching system for completing calls from originating lines extending to calling data subscribers to terminating lines extending to called data subscribers including common control equipment for interconnecting the originating and the terminating lines, means responsive to call initiating signals from each calling subscriber for requesting connection to the common control equipment, the common control equipment being released from the connection after each interconnection attempt, and means jointly responsive to activity of the common control equipment exceeding a predetermined level within the activity capacity of the equipment and to abandonment of the interconnection attempt by the common control equipment before completion of the call to the called subscriber for rendering the requesting means unresponsive to the call initiating signals.

14. In a switching system, in accordance with claim 13, wherein the called subscriber sends "answer" data signals to indicate completion of the call, the common control equipment sends predetermined signals to indicate abandonment of the attempt, and the disabling means includes means responsive to the predetermined signals from the common control equipment in the absence of the "answer" data signals from the called subscriber for operating the disabling means.

15. In a switching system, in accordance with claim 14, wherein the common control equipment sends digital data signals to the originating line in response to the connection thereto and the disabling means further includes means responsive to the digital data signals for enabling the operating means.

* * * * *

UNITED STATES PATENT AND TRADEMARK OFFICE
CERTIFICATE OF CORRECTION

PATENT NO. : 3,959,599
DATED : May 25, 1976
INVENTOR(S) : Donald Masco, Edward J. McNamara, Arnold C. McQuaide, Jr., Randolph J. Pilc, Peter S. Warwick It is certified that error appears in the above—identified patent and that said Letters Patent are hereby corrected as shown below:

Column 2, line 2, after "set" insert --up--.
Column 11, line 56, after "the" change "bite" to --bits--.
Column 12, line 30, change "2626" to --2626'--. Column 14, line 29, change "required" to --requested--.

Signed and Sealed this

Nineteenth Day of October 1976

[SEAL]

Attest:

RUTH C. MASON
Attesting Officer

C. MARSHALL DANN
Commissioner of Patents and Trademarks